(12) United States Patent
Cecchi

(10) Patent No.: US 6,843,818 B1
(45) Date of Patent: *Jan. 18, 2005

(54) STERILIZED FILTER AND A METHOD FOR MANUFACTURING THE SAME

(75) Inventor: Michael Cecchi, Madison, CT (US)

(73) Assignee: genX International, Inc., Guilford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 45 days.

(21) Appl. No.: 10/437,340

(22) Filed: May 13, 2003

Related U.S. Application Data

(60) Provisional application No. 60/379,931, filed on May 13, 2002.

(51) Int. Cl.⁷ .............................................. B01D 50/00
(52) U.S. Cl. .................. 55/385.2; 55/467; 55/472; 55/486; 55/503; 96/223; 96/224; 261/121.1; 422/24; 422/121; 435/303.1; 435/809
(58) Field of Search ................. 55/385.2, 467, 55/472, 486, 503; 96/223, 224; 261/121.1; 422/24, 121; 435/303.1, 809

(56) References Cited

U.S. PATENT DOCUMENTS

| | | | | |
|---|---|---|---|---|
| 5,837,040 A | * | 11/1998 | Caughron et al. | 55/385.2 |
| 6,013,119 A | * | 1/2000 | Cecchi et al. | 55/385.2 |
| 6,149,699 A | * | 11/2000 | Grantham | 55/385.2 |
| 6,200,362 B1 | * | 3/2001 | Cecchi et al. | 55/486 |
| 6,364,923 B1 | * | 4/2002 | Wiedmeyer et al. | 55/385.2 |
| 6,589,323 B1 | * | 7/2003 | Korin | 96/223 |

* cited by examiner

Primary Examiner—Blaine Copenheaver
Assistant Examiner—Minh-Chau T. Pham
(74) Attorney, Agent, or Firm—Edwards & Angell, LLP; George N. Chaclas

(57) ABSTRACT

A method of manufacturing a filter preferably for an anabolic chamber or incubator utilizing an activated carbon of the filter which has been vacuumed to remove contaminants. The assembly occurs in a clean room environment. Upon assembling the filter, vacuum sealing the filter in a bag further assures that the sterilization of the filter is maintained. Moreover, the method may subject the vacuum sealed filter to gamma radiation to kill any molds, germs and bacteria that may exist in the filter after the assembly process.

16 Claims, 2 Drawing Sheets

STERILIZED FILTER AND A METHOD FOR MANUFACTURING THE SAME

CROSS-REFERENCE TO RELATED APPLICATION

This application claims priority to U.S. Provisional Patent Application No. 60/379,931, filed May 13, 2002, which is incorporated herein by reference.

BACKGROUND OF THE INVENTION

1. Field of the Invention

The subject disclosure relates to a method of manufacturing a filter and, more particularly to, a carbon filter fabrication process wherein the filter is free of undesirable contaminants.

2. Background of the Related Art

Filters are used for removing particulates and gases from the air and the environment of which the user intends to clean or purify. Currently most filters are manufactured or assembled in regular environmental or general assembly conditions. Such conditions will allow these filters to come in contact with particulates and gases that are present within this environment. Through this contact, the filters may retain or absorb unwanted particulates and gases that are present in the assembly environment. A particularly problematic material used during the manufacturing or assembly process is carbon which is used as an absorption ingredient. The carbon may absorb unwanted gases or volatile organic compounds ("VOC") from the assembly environment.

For an additional example, particulates, unwanted VOC and other gases are absorbed into the HEPA or particulate filtering material, or additional filtering material and then introduced into the environment in which the filter is intended to clean.

In short, undesirable contamination occurs when the environment that you are introducing the filter to is cleaner than the filter itself or does not contain certain particulates and contaminants that may be present in the filter. In such circumstances a negative impact upon the environment results when the filter and the filtering mechanism begin to release these contaminants into the environment. This contamination defeats or at least diminishes achieving the very objective of the filter system.

Currently the improvement of the air within a closed environment such as an incubator or an anabolic chamber as is addressed by U.S. Pat. No. 6,013,119 to Cecchi et al. and U.S. Pat. No. 6,200,362 to Cecchi et al., each of which is incorporated herein by reference in their entirety. These patents recognize the benefits of removing VOC and chemical air contaminants from the closed environment of a cell culture incubator or chamber.

Despite these advantages, however, there can be inconsistency of cell and embryonic development among different lot numbers of filters and from different batches of filters that are used inside and outside the incubator or chamber due to filter contamination as noted above. Improved embryonic and cell culture development only occurs by removing nearly all volatile organic compounds and particulates from the air.

Moreover, the prior art does not address the separate effects of viruses, bacteria, particulates and contaminants that may attach to particulates or contaminants like mold that may exist in the assembly process environment and are transferred into the environment by the introduction of the filter which is intended to clean the environment. There is a need, therefore, for an improved method of manufacturing a filter which prevents contamination and aids in assuring adequate sterilization of the filter.

SUMMARY OF THE INVENTION

The subject disclosure relates to an improved method of manufacturing and assembling filters used in cell culture and embryonic development.

The filters are manufactured in an environment free from particulates or gases which may be detrimental to the intended use of the filter. The particulates may be in the form of organic materials, bacteria and viruses. The gases may be in the form of harmful, inert, volatile organic compounds or chemical air contaminants. These filters may be placed within an environment in such a way that the air circulates through these filters many times.

In one embodiment, the filters not only remove unwanted contaminants but keep the unwanted contaminants from entering the environment. The filters may be within the air circulation stream of an incubator, in the incoming air path from the environment outside an incubator, or in line with gas cylinders which may be used to provide specific gases, such as $CO_2$ or nitrogen, to a closed environment within an incubator, anabolic chamber.

The subject disclosure is a method for handling the filter components during the assembly process, evacuating the air from the components and therefore removing unwanted gases and particulates from the filter materials.

Testing of these filters before and after use has also eradicated the difference in what may have been absorbed by the filters during the manufacturing and assembly process before use and after use without variance from batch to batch.

It is, therefore, an object of this invention to assemble a filter, which does not transmit, or discharge particulates or volatile organic compounds into the environment of which the filter is placed.

It is, therefore, an object of this invention to remove from the filtering material, by a specific method, the contaminants which may be absorbed by the filter material during assembly.

It is therefore an object of this invention to sterilize the filter assembly by gamma irradiation to suppress and eliminate mold spores, bacteria and infectious matter that may be present within the filter.

These and other unique features and advantages of the invention disclosed herein will become more readily apparent from the following description, the accompanying drawings and the appended claims.

BRIEF DESCRIPTION OF THE DRAWINGS

So that those having ordinary skill in the art to which the disclosed invention appertains will more readily understand how to make and use the same, reference may be had to the drawings wherein.

DETAILED DESCRIPTION OF THE PREFERRED EMBODIMENTS

Figure 1:
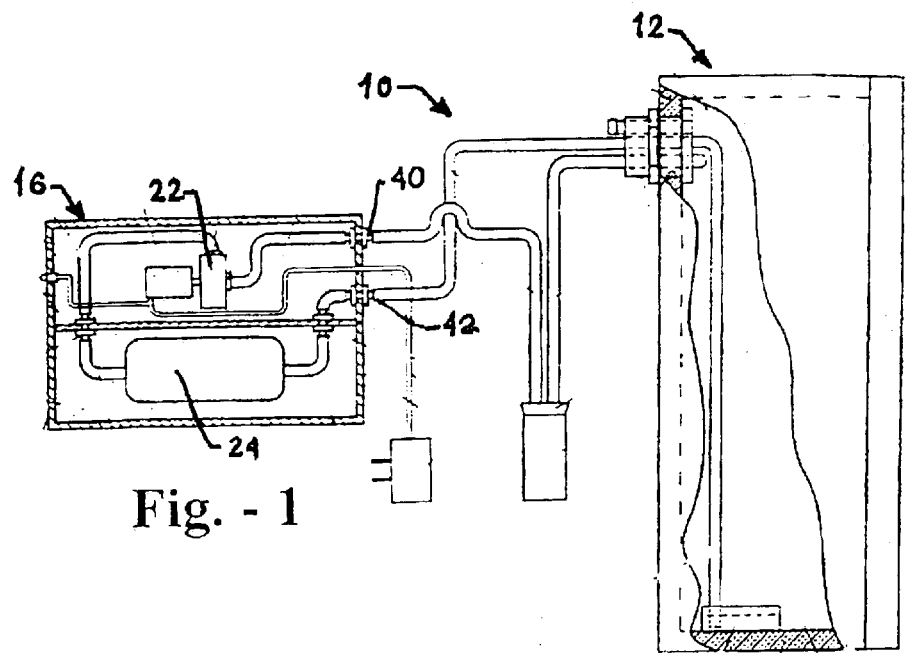
FIG. 1 is an overview of an environment in which a filter manufactured in accordance with the subject disclosure may be used.

The present invention overcomes many of the prior art problems associated with manufacturing filters. The advantages, and other features of the systems and methods disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Referring to FIG. 1, a schematic diagram of a filtering system 10 for an incubator with the filter unit provided outside the incubator is shown. The filtering system 10 includes an incubator 12 for storing specimens in a controlled environment and a filter unit 16 for maintaining the cleanliness of the environment. The filter unit 16 contains a pump 22 for moving air through the filter unit and a filter 24 constructed in accordance with the subject disclosure. The filter unit 16 has an air inlet port 40 and an air outlet port 42 to receive air from the incubator 12 and return filtered air to the incubator 12, respectively. It will be appreciated by those of ordinary skill in the pertinent art based upon review of the subject disclosure that the application of the filter may be in any situation which requires a filter such as for example, without limitation, a domestic drinking water filtration system, a automobile fuel line system, an air filter for a room and the like as would be appreciated by those of ordinary skill in the art.

Figure 2:
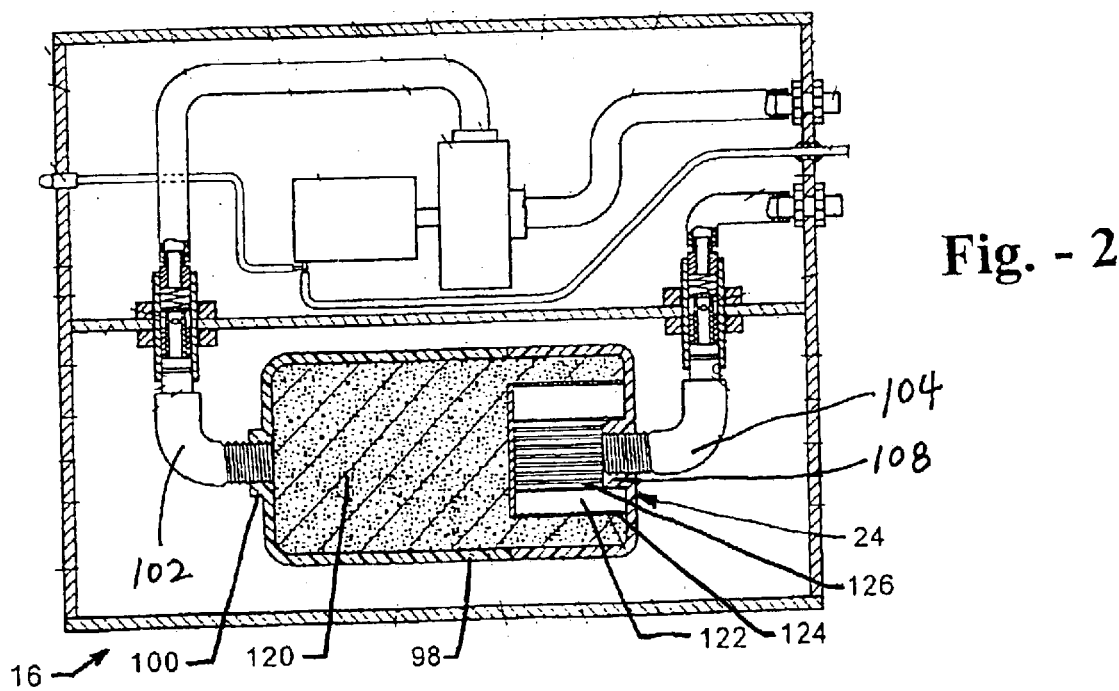
FIG. 2 is a cross-sectional view of a filter unit having a filter manufactured in accordance with the subject disclosure.

Referring to FIG. 2, the exemplary filter 24 has a generally cylindrical elongated casing 98 for defining an inlet port 100 and an outlet port 108. Tubes 102 and 104 threadably engage the inlet and outlet ports 100 and 108, respectively, in order to facilitate connection of the filter 24 to an air inlet and outlet of the incubator 12. The casing 98 houses a VOC filtering medium 120 and a particulate removing medium 122. The particulate removing medium 122 surrounds the outlet port 108 and the VOC filtering medium 120 surrounds the inlet port 100 such that the gas stream passing through the filter unit 16 passes through both mediums 120 and 122. In another embodiment, the filter 24 contains a single filtering medium.

Preferably, the VOC filtering medium 120 is activated carbon. In another preferred embodiment, the VOC filtering medium 120 is untreated carbon, activated charcoal, combinations of these preferred materials and the like although it is to be appreciated by those of ordinary skill in the art that other materials are capable of performing the necessary function such as filtering out VOC. Preferably, the particulate removing medium 122 is in the form of a hollow cylinder co-axial with the outlet port 108 and positioned against the casing 98. In one embodiment, the particulate removing medium 122 is HEPA filter media although other suitable filter media may be used such as, without limitation, non-woven filter media. In a preferred embodiment, the particulate removing medium 122 is a pleated filter element having a cylindrical outer periphery 124 and an axially extending cylindrical bore 126.

Figure 3:
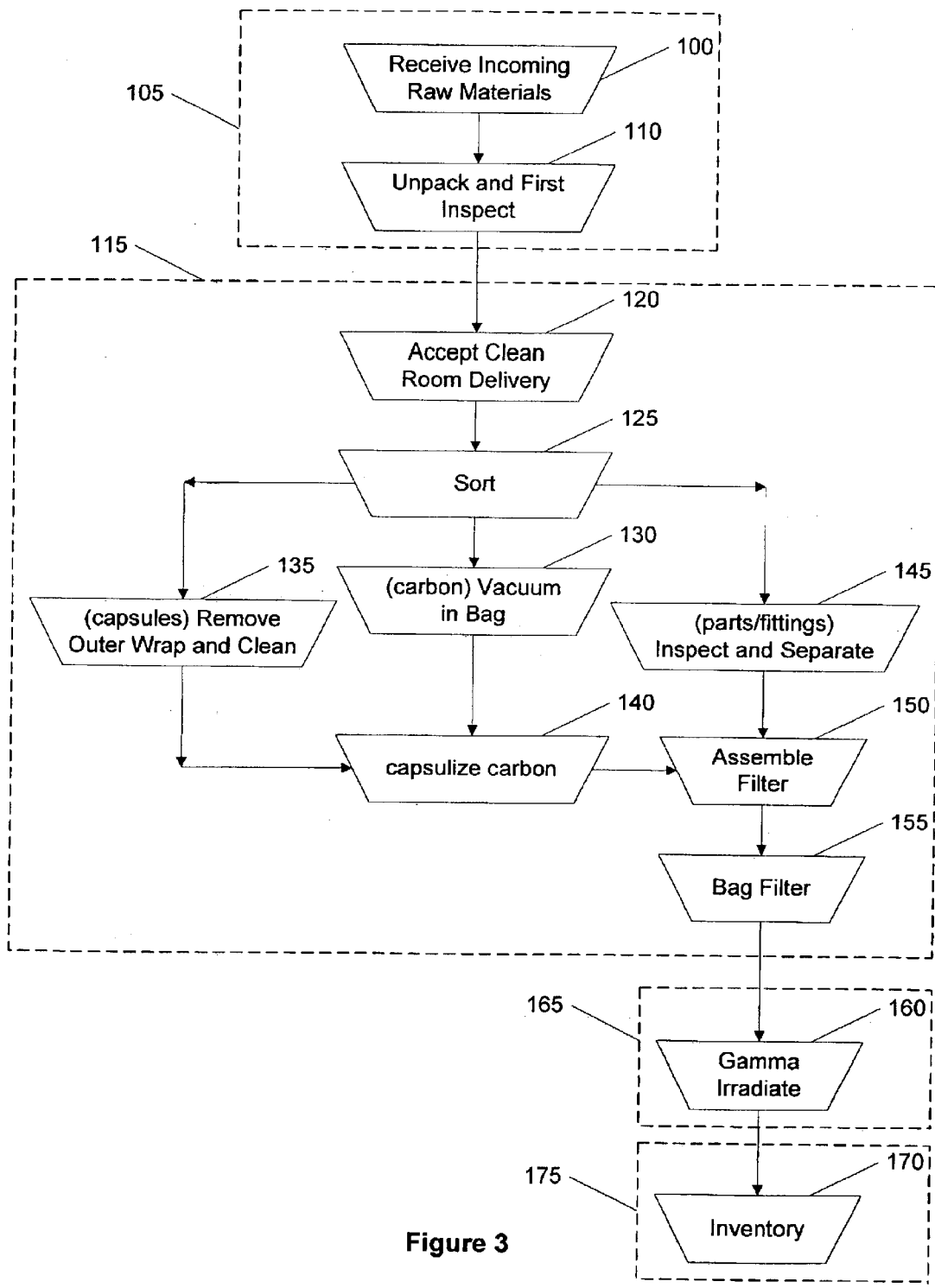
FIG. 3 is a somewhat schematic flowchart illustrating an embodiment of a process for manufacturing a filter in accordance with the subject disclosure

Referring to FIG. 3, the filter manufacturing process begins at step 100 when the filter material and components are initiated into the process. In the preferred embodiment, the particulate removing medium 122 is a HEPA filter material and the VOC filtering medium 120 is activated carbon. The components include casings 98, fittings such as the tubes 102 and 104, capsules for the activated carbon and any other component which may be required not only for filter 24 but for filter unit 16 as well.

At step 110, the HEPA filter material, filter capsules and activated carbon are removed from their original packaging and inspected. Each of the steps 100 and 110 are preferably performed in a receiving area 105.

At step 120, the unpacked material is transferred from the receiving area 105 into a clean room environment 115. In the preferred embodiment, the clean room environment 115 consists of a repeat circulating air filtration system, which is designed to remove particulates and contaminants therefrom. Each of the steps 120–155 are preferably conducted in the clean room 115.

At step 125, the received items are sorted into three groups for appropriate treatment as follows: capsules; activated carbon; and parts and fittings.

At step 130, preferably the activated carbon is in a plastic bag as carbon is typically shipped. While still in the shipping bag, the carbon is vacuumed by using a small vacuum pump as would be appreciated by those of ordinary skill in the pertinent art based upon review of the subject disclosure. By vacuuming the activated carbon, most of the dust particulates and excess air from the shipping bag is removed, thus the particulates and VOC previously in the activated carbon and the shipping bag are removed.

At step 135, the filter capsules are unwrapped from the cleaned shipping material and cleaned directly. Once the filter capsules are ready for filling, the process proceeds to step 140 where the filter capsules are filled with the activated carbon within the clean room environment. To fill the filter capsules, the vacuumed activated carbon is removed from the bag. No additional recontamination of the carbon or filter capsules occurs because the filling operation is performed in a clean room environment.

At step 145, in parallel with steps 130, 135 and 140, the parts and fittings are inspected, separated and cleaned. The process proceeds to step 150 where all of the necessary components to manufacture a filter 24 are assembled in an environment which prevents recontamination, i.e. a clean room. Upon assembly at step 150, the filter 24 is properly labeled with labels which are toxic free and non-smear.

At step 155, the assembled filter 24 is prepared for transport through non-clean room environments. The filter 24 is inserted into a clean bag. Preferably, the clean bag is non-breathable plastic bags from 4 to 6 mil in thickness. The extra thickness of a filter poly bag creates a barrier against leakage and contamination, and maintains the vacuum condition of the sealed filter 24. Upon bagging the assembled filter 24, the air is removed from the bag prior to sealing. Vacuum/heat sealing equipment creates a vacuum in the bag and seals the opening of the bag by using heat. This additional vacuum operation prior to sealing removes even more of the VOC and particulates that may be present in the filter 24 despite the manufacturing being performed in a clean room.

At step 160, the assembled and vacuum packed filter 24 is transferred from the clean room 115 to a facility 165 which can gamma irradiate items for sterilization. It is envisioned that the gamma irradiation may also occur in a clean room environment although as long as the integrity of the vacuum bag is maintained, the cleanliness of the assembled filter 24 is maintained through unclean environments. The assembled filter 24 is gamma irradiated within the bag to kill any mold spores, germs, bacteria and the like which may be present as would be known to one of ordinary skill in the pertinent art based upon review of the subject disclosure.

At step 170, the sterilized bagged filter 24 is transferred from the gamma radiation facility 165 to a storage facility 175. Preferably, the filter 24 is stored in a warehouse for future shipment to a customer. In another embodiment, the filter 24 is sent directly to an end user who subsequently unwraps and installs the filter 24 for use. In another embodiment, the receiving area 105, clean room 115, gamma irradiation facility 165 and storage facility are all within the same location.

While the invention has been described with respect to preferred embodiments, those skilled in the art will readily appreciate that various changes and/or modifications can be made to the invention without departing from the spirit or scope of the invention as defined by the appended claims.

What is claimed is:

1. A method of assembling a filter by removing volatile organic compounds from the filter during the manufacturing process, the method comprising the steps of:

cleaning components of a filter in a clean room prior to assembly in the manufacturing process;

assembling the components in the clean room to make filter;

sealing the filter in a non-breathable container while in the clean room; and gamma irradiating the assembled filter in the non-breathable container.

2. A method as recited in claim 1, further comprising the step of creating a vacuum in the non-breathable container prior to sealing the filter.

3. A method as recited in claim 1, wherein the step of cleaning the components includes the steps of wiping, vacuuming and inspecting the components.

4. A method as recited in claim 1, wherein the components are a casing, a volatile organic compound filter medium, and a particulate filter medium.

5. A method of assembling a filter for removing volatile organic compounds from the filter during the manufacturing process, the method comprising the steps of:

receiving a VOC filtering medium and a housing for retaining the VOC filtering medium;

vacuum cleaning the VOC filtering medium in a clean room during manufacturing the filter;

cleaning the housing in the clean room during manufacturing the filter;

assembling the VOC filtering medium in the housing in the clean room after cleaning the VOC filtering medium and the housing; and sealing the assembled filter in a non-breathable container.

6. A method as recited in claim 5, further comprising the step of gamma irradiating the assembled filter in the non-breathable container.

7. A method as recited in claim 5, further comprising the step of creating a vacuum in the non-breathable container.

8. A method as recited in claim 5, wherein the VOC filter medium is activated carbon received in a bag.

9. A method as recited in claim 5, further comprising the steps of receiving a particulate removing medium in the clean room, vacuum cleaning the particulate removing medium in the clean room and assembling the particulate removing medium in the housing in the clean room.

10. A sterilized filter assembly comprising:

a filter including
       a casing for defining an inlet port and an outlet port; and
       at least one filtering medium housed within the casing wherein the casing and the at least one filtering medium have each been mechanically cleaned and gamma irradiated for sterilization during fabrication of the sterilized filter so as to minimize contamination prior to filter installation; and a bag enclosing the filter in a vacuumed and sealed environment.

11. A sterilized filter assembly as recited in claim 10, wherein the at least one filtering medium is a VOC filtering medium and a particulate removing medium arranged such that as a gas stream passing through the filter assembly passes through the VOC filtering medium and the particulate removing medium.

12. A sterilized filter assembly as recited in claim 10, further comprising cleaned tubes for threadably engaging the inlet and outlet ports, respectively, in order to facilitate connection of the sterilized filter to an air inlet and outlet of an incubator.

13. A sterilized filter assembly as recited in claim 10, wherein mechanically cleaning includes wiping and vacuuming in a clean room environment.

14. A filtering system for an anabolic chamber, the filtering system comprising:

an incubator for storing specimens in a controlled environment; and a filter unit for maintaining a cleanliness of the controlled environment, wherein the filter unit includes
       a pump for moving air of the controlled environment through the filter unit; and
       a sterilized filter, wherein the sterilized filter includes a casing for defining an inlet port and an outlet port and a filtering medium housed within the casing wherein the casing and the filtering medium have each been mechanically cleaned in a clean environment prior to assembly of the filter to remove contaminants, sealed and gamma irradiated for sterilization.

15. A filtering system as recited in claim 14, wherein the filter unit is mounted outside the incubator.

16. A filtering system as recited in claim 14, wherein the filter unit is mounted inside the incubator.

* * * * *